US009716911B2

(12) United States Patent
Han et al.

(10) Patent No.: US 9,716,911 B2
(45) Date of Patent: Jul. 25, 2017

(54) TERMINAL AND METHOD FOR PERFORMING BIDIRECTIONAL IPTV SERVICE

(71) Applicant: SK TELECOM CO., LTD., Seoul (KR)

(72) Inventors: Yong-hee Han, Suwon-si (KR); Jong-pil Youn, Seongnam-si (KR); Hyung-joon Cho, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 51 days.

(21) Appl. No.: 14/692,404

(22) Filed: Apr. 21, 2015

(65) Prior Publication Data

US 2015/0229984 A1 Aug. 13, 2015

Related U.S. Application Data

(63) Continuation of application No. PCT/KR2013/009379, filed on Oct. 21, 2013.

(30) Foreign Application Priority Data

Oct. 31, 2012 (KR) .................. 10-2012-0122547
Sep. 12, 2013 (KR) .................. 10-2013-0109965

(51) Int. Cl.
*H04N 21/422* (2011.01)
*H04N 21/643* (2011.01)

(52) U.S. Cl.
CPC . *H04N 21/42208* (2013.01); *H04N 21/42209* (2013.01); *H04N 21/64322* (2013.01)

(58) Field of Classification Search
CPC ....... H04N 21/42209; H04N 21/42208; H04N 21/4753; H04N 21/25816; H04N 21/4367;

(Continued)

(56) References Cited

U.S. PATENT DOCUMENTS

2007/0180485 A1* 8/2007 Dua .................. H04L 29/06027
725/114
2008/0094245 A1* 4/2008 Hardacker ............. G05B 15/02
340/4.32

(Continued)

FOREIGN PATENT DOCUMENTS

KR        100675130 B1    1/2007
KR    1020100060714 A    6/2010

(Continued)

OTHER PUBLICATIONS

International Search Report for PCT/KR2013/009379 dated Feb. 17, 2014.

*Primary Examiner* — Nathan Flynn
*Assistant Examiner* — Cynthia Fogg
(74) *Attorney, Agent, or Firm* — Hauptman Ham, LLP

(57) ABSTRACT

A terminal device for carrying out an interactive internet protocol television (IPTV) service comprises: a near distance communication unit to receive set-top box information from a remote controller which controls a set-top box used for the interactive IPTV service; a session setup unit to set up a session to communicate between the terminal device and the set-top box based on the set-top box information; a content information receiver to receive, from the set-top box, content information on content being played by the set-top box over the set up session; a content information transmitter is configured to transmit the content information received from the content information receiver to an information provider; and content-related information receiver to receive content-related information from the information provider, the content-related information is extracted by the information provider from prestored information on a plurality of contents based on the content information.

12 Claims, 4 Drawing Sheets

(58) Field of Classification Search
CPC ........... H04N 21/25875; H04N 21/436; H04N 21/43615; H04N 5/4403; H04N 21/4126; H04N 21/42204; H04N 21/6334; H04N 7/17318; H04N 21/42225; H04N 21/42226; H04L 63/083; H04L 63/0853; H04W 12/08; H04W 12/06; G08C 2201/21; G08C 2201/92
USPC ......................................................... 725/38
See application file for complete search history.

(56) References Cited

U.S. PATENT DOCUMENTS

| | | | | |
|---|---|---|---|---|
| 2012/0324517 | A1* | 12/2012 | Ogle | G08C 17/02 725/81 |
| 2013/0005250 | A1* | 1/2013 | Kim | H04N 21/4126 455/41.1 |
| 2013/0174188 | A1* | 7/2013 | Gagnon | H04N 21/254 725/13 |
| 2014/0020081 | A1* | 1/2014 | Zhang | H04L 63/083 726/9 |

FOREIGN PATENT DOCUMENTS

| | | |
|---|---|---|
| KR | 1020100069474 A | 6/2010 |
| KR | 1020110127040 A | 11/2011 |
| KR | 1020120061589 A | 6/2012 |

\* cited by examiner

TERMINAL AND METHOD FOR PERFORMING BIDIRECTIONAL IPTV SERVICE

CROSS-REFERENCE TO RELATED APPLICATIONS

The present application is a continuation of International Patent Application No. PCT/KR2013/009379, filed Oct. 21, 2013, which claims priority to Korean Patent Application No. 10-2012-0122547, filed on Oct. 31, 2012, and Korean Patent Application No. 10-2013-0109965, filed on Sep. 12, 2013. The disclosures of the above-listed applications are hereby incorporated herein by reference in their entirely.

TECHNICAL FIELD

The present disclosure relates to an apparatus and method for providing an interactive internet protocol television (IPTV) service by using a near field communication (NFC) functionality.

BACKGROUND

The statements in this section merely provide background information related to the present disclosure and do not constitute prior art.

Recent change of broadcasting system from analog to digital format reshapes the broadcasting system towards multi-channel environments of broadcast channels and higher quality of program audios and videos. The inventor(s) has noted that this enables hundreds of channels to cast a variety of information and to be available for convenient access by users. In addition, such a broadcasting system interworks with mobile communication networks to provide an advanced broadcasting environment. It facilitates two-way interactive television services which empower the viewer who had passively consumed the program offerings to become an active user capable of participating in the program or selecting a desired program to receive at a desired time. Further, while watching the broadcast, the user can now conveniently find and purchase the program's content tie-in products, e.g. auxiliary information on the character or hand props that appears on the program content.

Meanwhile, the inventor(s) has noted that in order for a user to use content-related information with the known interactive IPTV service, the extra information on the exposed tie-in products need to be preprocessed into metadata which in turn undergoes the required high-cost off-line work for inserting the metadata into the content (off-line editing). The inventor(s) has therefore experienced that such a service is prone to failure for a user to receive information on the user's interested tie-in products, diminishing the versatility of the interactive IPTV service.

SUMMARY

In accordance with some embodiments of the present disclosure, a terminal device for carrying out an interactive internet protocol television (IPTV) service comprises a near distance communication unit, a session setup unit, a content information receiver, a content information transmitter and a content-related information receiver. The near distance communication unit is configured to receive set-top box information from a remote controller which controls a set-top box used for the interactive IPTV service. The session setup unit is configured to set up a session to communicate between the terminal device and the set-top box based on the set-top box information. The content information receiver is configured to receive, from the set-top box, content information on content being played by the set-top box over the set up session. The content information transmitter is configured to transmit the content information received from the content information receiver to an information provider. And the content-related information receiver is configured to receive a content-related information from the information provider, the content-related information is extracted by the information provider from prestored information on a plurality of contents based on the content information.

In another aspect of the present disclosure, a terminal device for carrying out an interactive internet protocol television (IPTV) service comprises a near distance communication unit, an information receiver, a session setup unit, a content information receiver, a content information transmitter and a content-related information receiver. The near distance communication unit is configured to receive remote controller-specific information of a remote controller from the remote controller which controls a set-top box used for the interactive IPTV service. The information receiver is configured to transmit the remote controller-specific information to an information provider so as to receive, from the information provider, set-top box information that matches the remote controller-specific information. The session setup unit is configured to set up a session to communicate between the terminal device and the set-top box based on the set-top box information. The content information receiver is configured to receive, from the set-top box, content information on content being played by the set-top box over the set up session. The content information transmitter is configured to transmit the content information received from the content information receiver to the information provider. And the content-related information receiver is configured to receive a content-related information from the information provider, the content-related information is extracted by the information provider from prestored information on a plurarity of contents based on the content information.

DETAILED DESCRIPTION

Figure 1:
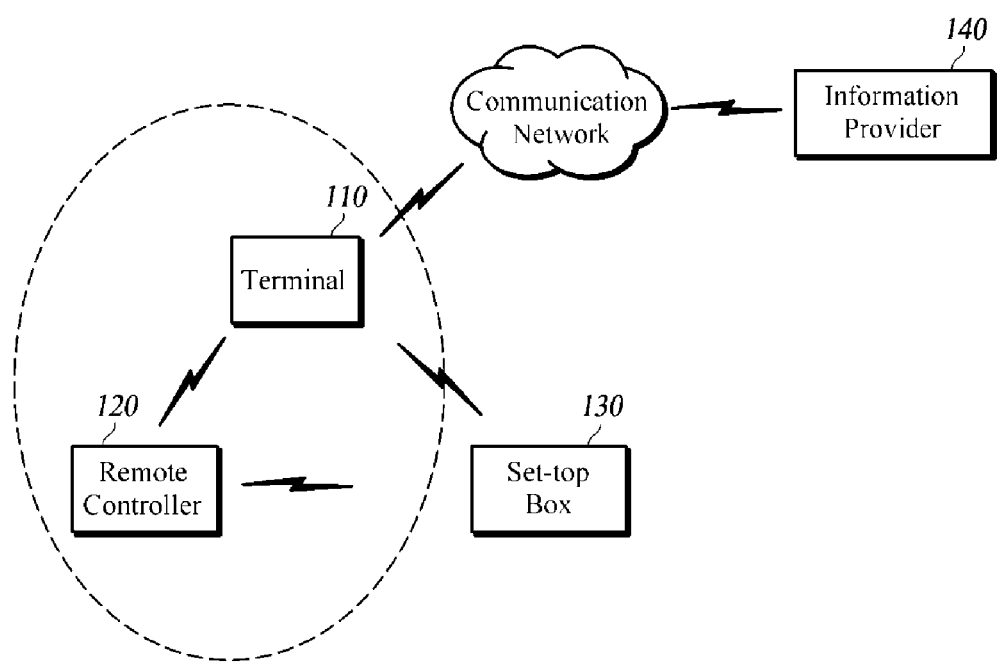
FIG. 1 is a diagram of an interactive IPTV service system according to at least one embodiment.

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Some embodiments of the present disclosure provide simplifying the interworking between a set-top box and a terminal by the provision of an interactive internet protocol television (IPTV) service, wherein the an interactive IPTV service comprises receiving set-top box information by drawing the terminal incorporating near field communication (NFC) functionality close to a remote controller for the set-top box and setting up a session for data communication between the terminal and the set-top box based on the set-top box information. Then, the terminal receives and transmits content information on a content being currently played in the set-top box in the set-up session to a server, and receives, from the server, content-related information extracted based on the content information while resolving the high-cost requirement by the known interactive IPTV service to thereby increase the efficiency of the interactive IPTV service.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Internet protocol TV or IPTV refers to a service provided through the television receiver and a high-speed Internet for offering various information, video content and broadcast programs. Different from the existing Internet TV, the IPTV utilizes a television set instead of a computer monitor and a remote controller instead of a computer mouse. IPTV users can search, by using a remote controller, the Internet and receive various services such as movies, home shopping, home banking, online games, MP3, etc. IPTV has a little difference from the known cable TV or the satellite TV in that it provides bi-directional interactivity. Therefore, over the known terrestrial broadcasting, cable TV or satellite broadcasting, IPTV provides the edge for viewers to select only the programs they want to watch at their convenient time. Some embodiments of the present disclosure use the NFC function for enabling a terminal to work with a remote controller, whereby set-top box information can be received from the remote controller. Some embodiments of the present disclosure use the NFC for enabling a terminal to work with a set-top box so as to simplify the interoperation between the terminal and the set-top box. Some embodiments of the present disclosure use the content information received by a terminal from a set-top box as a basis for receiving content-related information to implement a method of providing an interactive IPTV service different from the known methods for inserting metadata into the content.

Although it is described that the terminal interworks with the remote controller by way of the NFC function to receive information on the set-top box, the present disclosure is not limited thereto. For example, the terminal may communicate with the remote controller in different ways other than the NFC protocol, e.g., Wireless LAN, Bluetooth, HomeRF, IrDA, UWB, etc. (collectively "near distance communications") for exchanging the set-top box information, or the terminal may internally store the set-top box information.

A near field communication or NFC is a type of non-contact wireless communication protocol which uses the bandwidth of 13.56 MHz, for transferring data at low power and within a distance of 10 cm or less. The near distance communication supports the bit-rate of 424 Kbps and facilitates various services such as transportation service, payment service and the like by drawing two or more NFC-enabled devices close to each other without human intervention. The terminal and the remote controller according to the embodiments of the present disclosure are provided with a module capable of performing the NFC functionality.

FIG. 1 is a diagram of an interactive IPTV service system 100 according to at least one embodiment of the present disclosure.

As FIG. 1 illustrates, interactive IPTV service system 100 according to the present disclosure includes a terminal 110, a remote controller 120, a set-top box 130 and an information provider 140. FIG. 1 depicts the NFC range of remote controller 120 in a dotted line which encompasses terminal 110. Other components of the interactive IPTV service system 100, such as each of the terminal 110, the remote controller 120, the set-top box 130 and the information provider 140 is implemented by, or includes, one or more processors and/or application-specific integrated circuits (ASICs). Each of the terminal 110, the remote controller 120, the set-top box 130 and the information provider 140 comprises input units such as one or more buttons, a touch screen, a mic and so on, and output units such as a display, an indicator and so on.

Terminal 110 refers to a device that transmits and receives various data through data relaying devices including APs (access points) according to user's key operations. Terminal 110 may be one of a tablet PC (personal computer), a laptop computer, a smart phone, a PDA (personal digital assistant), a mobile communication terminal, and the like. Terminal 110 is adapted to perform a voice or data communications by using an AP and a network, and it also represents a terminal having a memory for storing various software programs or protocols for communicating with devices via the AP and the network, a microprocessor for executing the programs so as to perform operations and control, and the like. Terminal 110 according to embodiments is provided with an NFC-enabled module so that, when remote controller 120 having its NFC-enabled module comes in a close distance, terminal 110 recognizes tag information of remote controller 120 and receives information on set-top box 130 from remote controller 120.

Terminal 110 used in interactive IPTV service system 100 performs an interactive IPTV service as it interworks with set-top box 130.

Terminal 110, upon recognizing tag information of remote controller 120, receives information on set-top box 130 from remote controller 120 through the near distance communication such as NFC. In addition, as described above, the terminal and the remote controller may use other communication methods than the NFC to exchange the set-top box information or the terminal may store the set-top box information in its memory.

The set-top box information received by terminal 110 refers to information including an IP address. Terminal 110 uses the peer to peer (P2P) feature to receive the set-top box information from terminal 110.

Based on the received set-top box of the received set-top box information, terminal 110 establishes a session for performing data communication with set-top box 130. Here, the session refers to a logical connection for interaction between users and computers in the network environment. Terminal 110 receives an IP address of set-top box 130, and interworks with set-top box 130 by establishing a session for performing data communication with set-top box 130 based on the IP address. Through the above, terminal 110 provides a basis for carrying out the interactive IPTV services.

Terminal 110, upon recognizing tag information of remote controller 120, receives characteristic information of remote controller 120 therefrom through the near distance communication such as NFC. Besides the exemplary NFC function used to receive the remote controller specific information, the terminal and the remote controller may use other ways of communication to exchange the remote controller specific information or the terminal may store the remote controller specific information in its memory.

The information specific to remote controller 120 received by terminal 110 refers to information including a remote controller identification number. Here, the remote controller identification number is preset as a factory default setting or set by the user after its sale, and the same number is received by terminal 110 from remote controller 120 through the P2P feature of NFC.

Then, terminal 110 transmits the remote controller-specific information to information provider 140 and receives the set-top box information that matches the remote controller-specific information from information provider 140. Meanwhile, information provider 140 stores, upon receipt from one or more set-top boxes, remote controller-specific information unique to one or more remote controllers matching one or more set-top boxes and set-top box information including serial numbers and IP addresses of the set-top boxes. By transmitting the remote controller-specific information received to information provider 140, terminal 110 receives, from information provider 140, the set-top box serial number and the IP address which match the remote controller-specific information, among the prestored information. The information provider 140 is a server to perform the functions and operations stated above, and implemented by, or includes, one or more processors and/or application-specific integrated circuits (ASICs).

Terminal 110 receives the set-top box information including the serial number and the IP address of set-top box 130, and based thereon, sets up the session for performing data communication and interworking with set-top box 130. Thus, terminal 110 provides a basis for carrying out the interactive IPTV services.

The tag information of remote controller 120 recognized by terminal 110 is information preset with an NFC tag of remote controller 120, wherein the tag information of remote controller 120 in embodiments refers to the command to proceed with all stages towards the interactive IPTV services carried out by terminal 110. Meanwhile, although some embodiments illustrate that terminal 110 executes the command by the tag information of remote controller 120, the command may be executed by a software application preinstalled in terminal 110.

Thereafter, terminal 110 uses the sessions set up for receiving information on the content being played by set-top box 130. In other words, terminal 110 receives information on the content being played by set-top box 130 via wireless communication methods such as Bluetooth and RF communication based on the established session. Herein, the content played by set-top box 130 includes content information on a part or entire visual and audio content played by set-top box 130 during a predetermined period of time including the time point when the tag information of remote controller 120 is recognized, wherein the time point may coincide with either the receipt of the remote controller-specific information or the receipt of the set-top box information. In addition, the predetermined duration including the time point of recognizing the tag information of remote controller 120 is set by unit of seconds, but not limited thereto.

Terminal 110 transmits the content information received from set-top box 130 to information provider 140 through a communication network and receives, from information provider 140, content-related information extracted based on the content information. The content-related information according to some embodiments is selected from, but not limited to, a plurality of websites containing contents related to the content information transmitted by terminal 110 and it is a select information by a combined web page representation of URLs (uniform resource locators) of affiliated websites.

Remote controller 120 is a device for controlling set-top box 130 used for the interactive IPTV service. Remote controller 120 has received and saved the set-top box information including the IP address of set-top box 130 interworking with the corresponding remote controller 120. In addition, remote controller 120 has its unique number which is set as a factory default setting or set by the user after its sale.

When interworking with terminal 110 and set-up box 130, remote controller 120 checks whether terminal 110 comes within an NFC range. If terminal 110 is within the preset NFC range, remote controller 120 transmits its prestored set-top box information through the NFC P2P feature to terminal 110.

When interworking with terminal 110 and set-up box 130, remote controller 120 checks whether terminal 110 comes within an NFC range. If terminal 110 is within the preset NFC range, remote controller 120 transmits its remote controller identification number through the NFC P2P feature to terminal 110.

Set-top box 130 is a device for providing the television receiver with a variety of multimedia content including video content such as movies and broadcasting programs and Internet searches by using the ultra high-speed Internet network.

Set-top box 130 according to some embodiments operates to gain the information on remote controller 120 that controls set-top box 130 and the set-top box information containing the serial number and the IP address of set-top box 130, and to transmit such informations to information provider 140. When terminal 110 needs to interwork with set-top box 130, set-top box 130 transmits its IP address in advance to remote controller 120 to thereby relay its IP address eventually to terminal 110.

In addition, if terminal 110 and remote controller 120 interwork, set-top box 130 extracts and transmits, to terminal 110, information including content information on a part or entire visual and audio content played by set-top box 130 during a predetermined period of time including the time point when the tag information of remote controller 120 is recognized by terminal 110.

Information provider 140 stores, upon receipt from one or more set-top boxes, set-top box information including serial numbers and IP addresses of the one or more set-top boxes and remote controller-specific information unique to each of the one or more remote controllers adapted to control the one or more set-top boxes. Thereafter, when terminal 120 needs to interwork with set-top box 130, information provider 140 receives the remote controller identification number from terminal 110, extracts set-top box information that matches the remote controller identification number from the prestored information, and provides the extracted set-top box information to terminal 110.

In addition, upon receiving the content information from terminal 110, information provider 140 extracts corresponding content-related information from the prestored information which includes each content-related information corresponding to each of a plurality of contents based on the received content information, and transmits the extracted content-related information to terminal 110. Meanwhile, information provider 140 maintains prestored content-related information on the plurality of contents provided from corporations or individual businesses, wherein the content-related information is, for example, the URL address of the website including information on the corresponding content. In other words, upon receiving particular content information from terminal 110, information provider 140 provides terminal 110 with a combined web page indicating the content-related information relevant to a particular content information.

Figure 2:
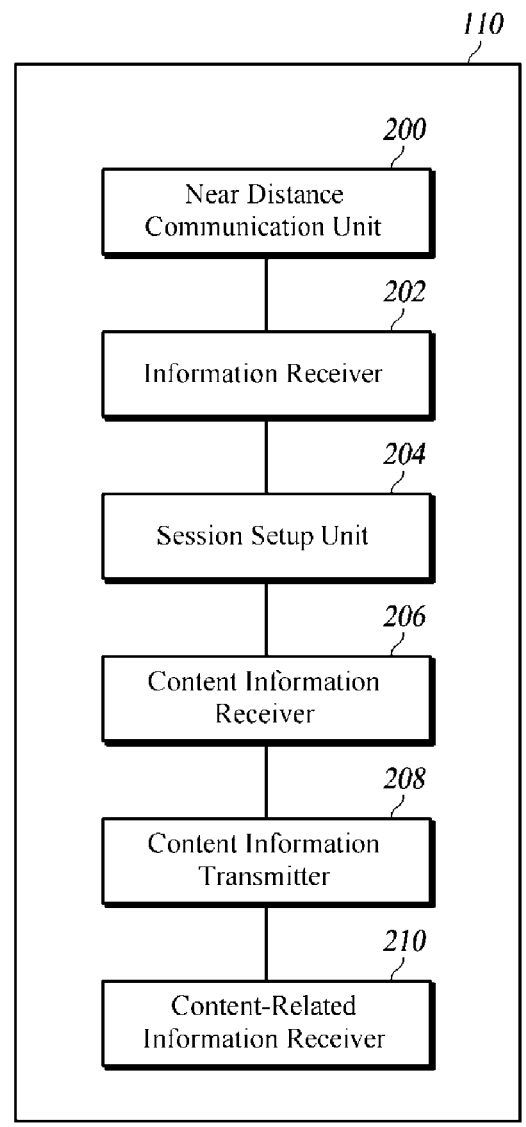
FIG. 2 is a diagram of a configuration of terminal for performing an interactive IPTV service according to at least one embodiment.

FIG. 2 is a diagram of a configuration of terminal 110 for performing interactive IPTV services according to at least one embodiment of the present disclosure.

As shown in FIG. 2, to perform interactive IPTV services, the terminal 110 includes a near distance communication unit 200, an information receiver 202, a session setup unit 204, a content information receiver 206, a content information transmitter 208 and a content-related information receiver 210. Meanwhile, terminal 100 used in interactive IPTV service system 100 according to the present disclosure operates as described in FIG. 1 for carrying out the interactive IPTV service in conjunction with set-top box 130. Other components of the terminal 110, such as each of the near distance communication unit 200, the information receiver 202, the session setup unit 204, the content information receiver 206, are implemented by, or includes, one or more processors and/or application-specific integrated circuits (ASICs). Each or combination of the content information transmitter 208 and the content-related information receiver 210 includes communication module(s) to process (e.g., modulation, coding, quantization and so on related to functions and operations in the field of the art) transmit and receive signal(s), in which the communication module(s) is implemented by, or includes, one or more processors and/or application-specific integrated circuits (ASICs). The terminal 110 comprises input units such as one or more buttons, a touch screen, a mic and so on, and output units such as a display, an indicator and so on.

Upon recognizing the tag information of remote controller 120 that controls set-top box 130 used for interactive IPTV services, near distance communication unit 200 as receives the set-top box information from remote controller 120 by using the near distance communication, NFC.

Herein, the set-top box information received by near distance communication unit 200 refers to information including the IP address of set-top box 130, and near distance communication unit 200 receives the set-top box information from remote controller 120 through the NFC P2P feature. In this case, remote controller 120 stores the IP address of set-top box 130, which has been received from set-top box 130.

Upon recognizing the tag information of remote controller 120 used for interactive IPTV services, near distance communication unit 200 receives the remote controller-specific information from remote controller 120 through the near distance communications.

The remote controller-specific information received by near distance communication unit 200 refers to information including the remote controller identification number. Here, the remote controller identification number is preset with remote controller 120 as a factory default setting or set by the user, and the same number is received by terminal 110 from remote controller 120 through the P2P feature of NFC.

In case terminal 110 interworks with set-top box 130, information receiver 202 receives and transmits the information specific to remote controller (120) from near distance communication unit 200 to information provider 140, and receives, from information provider 140, the set-top box information that matches the remote controller-specific information of the corresponding remote controller 120. Meanwhile, information provider 140 stores, upon receipt from one or more set-top boxes, the remote controller-specific information unique to one or more remote controllers matching one or more set-top boxes and set-top box information including serial numbers and IP addresses of the set-top boxes. Upon transmitting the remote controller identification number to information provider 140, information receiver 202 receives, from information provider 140, the serial number and the IP address of set-top box 130, which match the remote controller identification number of the corresponding remote controller, among the prestored information in information provider 140.

Based on the received set-top box information, session setup unit 204 establishes a session for performing data communication with set-top box 130. Here, the session refers to a logical connection for interaction between users and computers in the network environment. On the other hand, session setup unit 204 receives the set-top box information including its IP address from near distance communication unit 200, and has terminal 110 interwork with set-top box 130 by setting up a session for data communication based on the received IP address. By doing so, session setup unit 204 provides a basis for carrying out the interactive IPTV services.

Session setup unit 204 receives, from information receiver 202, the set-top box information including the serial number and the IP address of set-top box 130, and based thereon, sets up the session for performing data communication and has terminal 110 interwork with set-top box 130. By doing so, session setup unit 204 provides a basis for carrying out the interactive IPTV services.

Content information receiver 206 uses the session set up by session setup unit 204 for receiving information on the content being played by set-top box 130. In other words, content information receiver 206 receives information on the content being played by set-top box 130 under a wireless communication scheme such as Bluetooth and RF communication through the session. At this time, the content information on a part or all of content currently played by set-top box 130 includes content information on a part or all of the content (i.e., content including at least one of visual content and audio content) played by set-top box 130 during a predetermined period of time including the time point when the tag information of remote controller 120 is recognized. In addition, the predetermined duration including the time point of recognizing the tag information of remote controller 120 is set by unit of seconds, although not limited thereto.

Content information transmitter 208 receives and transmits the content information from information receiver 206 to information provider 140.

Content-related information receiver 210 receives, from information provider 140, content-related information extracted based on the content information. Meanwhile, information provider 140 maintains stored content-related information provided from corporations or individual businesses, wherein the content-related information stored in information provider 140 is the URL address of the website including information about the corresponding content. In other words, upon receiving content information from content information transmitter 208, information provider 140 extracts content-related information associated with the corresponding content information. Content-related information receiver 210 receives the extracted content-related information from information provider 140.

Figure 3:
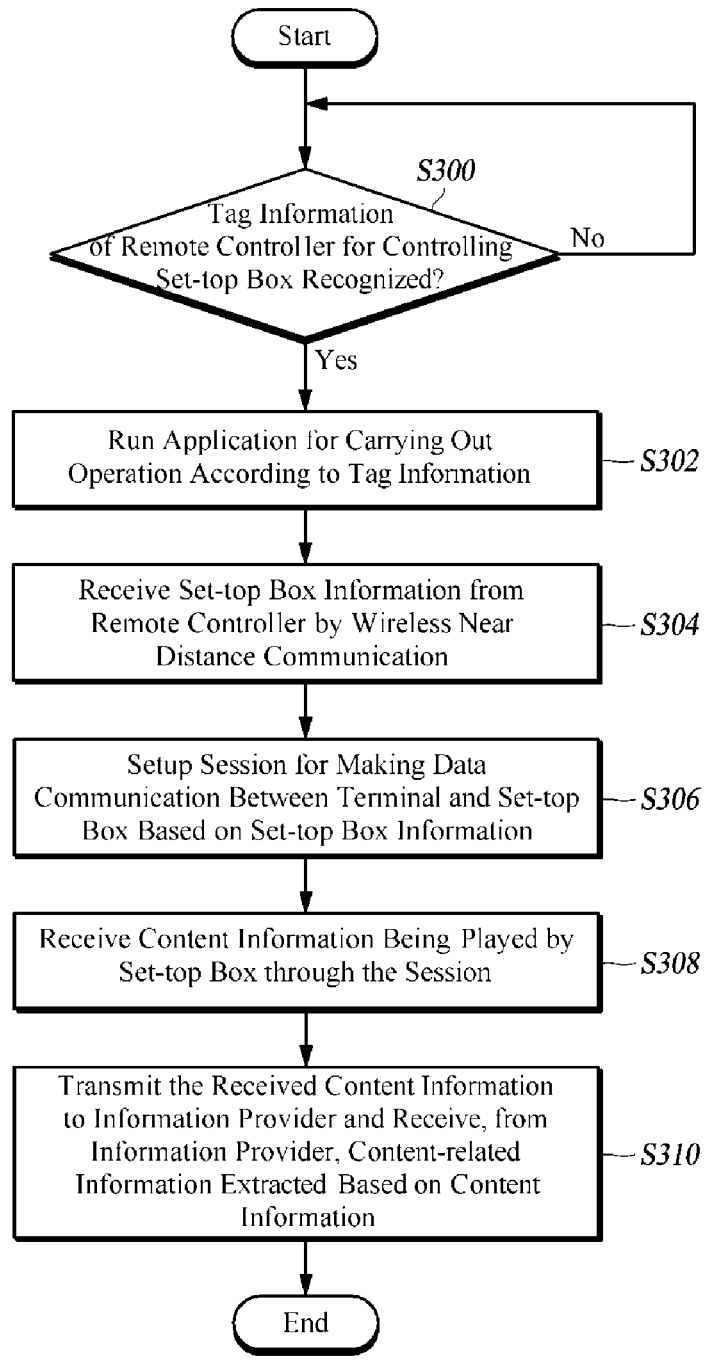
FIG. 3 is a flowchart of a method performed by a terminal according to at least one first embodiment for performing an interactive IPTV service.

FIG. 3 is a flowchart illustrating a method for performing an interactive IPTV service by using terminal 110 according to at least one first embodiment.

As shown in FIG. 3, the method for performing an interactive IPTV service by using terminal 110 starts when near distance communication unit 200 initially determines whether there is a recognized tag information of remote controller 120 for controlling set-top box 130 (S300). Near distance communication unit 200 carries out the NFC operation by drawing terminal 110 close to the NFC range preset with remote controller 120 and determines whether the tag information of remote controller 120 is recognized.

When the tag information of remote controller 120 is recognized, terminal 110 runs a software application for carrying out an operation according to the tag Information (S302). Here, the tag information of remote controller 120 refers to the command to proceed with all stages towards the interactive IPTV services carried out by terminal 110. In other words, when the application runs, the units in terminal 110 shown in FIG. 2 perform the aforementioned functions.

Near distance communication unit 200 receives the set-top box information from remote controller 120 through near distance communication (S304). Near distance communication unit 200 receives the set-top (130) information from remote controller 120 through the NFC P2P feature. In this case, remote controller 120 stores the IP address of set-top box 130, which has been received from set-top box 130. Here, the terminal and the remote controller may use other communication ways than NFC to exchange the set-top box information or the terminal may already have the set-top box information in store.

Session setup unit 204 establishes a session for performing data communications with set-top box 130 based on the set-top box (130) information (S306). Session setup unit 204 receives, from near distance communication unit 200, the set-top box information including the serial number and the IP address of set-top box 130, and based on the received IP address, sets up the session for performing a data communication and allows terminal 110 to interwork with set-top box 130.

Content information receiver 206 receives, from set-up box 130, the content information being played by set-top box 130 over the session set at session setup unit 204 (S308). Content information receiver 206 receives information on the content (e.g., a part or entire visual and audio content) being played by set-top box 130 through wireless communications such as Bluetooth and RF communication schemes based on the preset session. At this time, the content information on the content being played in set-top box 130 includes content information on a part or all of the content (i.e., content including at least one of visual content and audio content) played by set-top box 130 during a predetermined period of time including the time point when the tag information of remote controller 120 is recognized.

Content information transmitter 208 transmits the received content information to information provider 140, and content-related information receiver 210 receives, from information provider 140, content-related information extracted based on the content information (S310). Content-related information receiver 210 receives, from information provider 140, the content-related information on the content that content information transmitter 208 has sent to information provider 140, among the prestored information in information provider 140.

Figure 4:
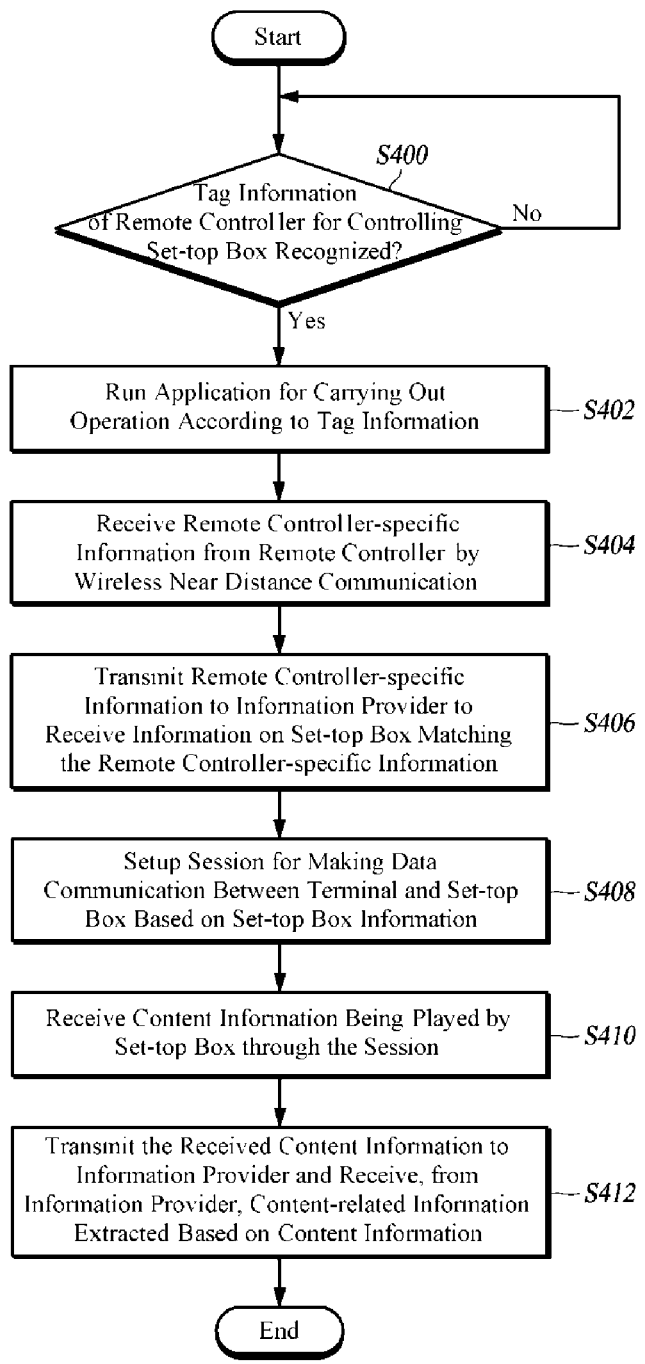
FIG. 4 is a flowchart of a method performed by a terminal according to at least one second embodiment for performing an interactive IPTV service.

FIG. 4 is a flowchart of a method performed by terminal 110 according to at least one second embodiment for performing an interactive IPTV service.

As shown in FIG. 4, the method for performing an interactive IPTV service with terminal 110 starts when near distance communication unit 200 determines whether there is recognized tag information of remote controller 120 for controlling set-top box 130 (S400). Near distance communication unit 200 carries out the NFC operation when terminal 110 draws close to the NFC range and determines whether the tag information of remote controller 120 is recognized.

When the tag information of remote controller 120 is recognized, terminal 110 runs a software application for carrying out an operation according to the tag Information (S402). Here, the tag information of remote controller 120 refers to a command to proceed with all stages towards the interactive IPTV services carried out by terminal 110. In other words, when the application runs, the units in terminal 110 shown in FIG. 2 perform the aforementioned functions.

Near distance communication 200 receives remote controller-specific information from remote controller 120 through near distance communication (S404). Near distance communication unit 200 receives remote controller-specific information of remote controller 120 through the NFC P2P feature, wherein the remote controller-specific information includes the remote controller identification number. In this case, the remote controller identification number is preset with remote controller 120 as a factory default setting or set by the user. Here, the terminal and the remote controller may use methods of communication other than the NFC to exchange the remote controller specific information or the terminal may have the remote controller specific information in store.

Information receiver 202 transmits the remote controller-specific information of remote controller 120 to information provider 140 to receive the set-top box information that matches the remote controller-specific information (S406). Meanwhile, information provider 140 stores, upon receipt from one or more set-top boxes, remote controller-specific information unique to one or more remote controllers matching one or more set-top boxes and set-top box information including serial numbers and IP addresses of the set-top boxes. By transmitting the remote controller-specific information to information provider 140, information receiver 202 receives, from information provider 140, the set-top box serial number and the IP address which match the corresponding remote controller identification number, among the prestored information in information provider 140.

Session setup unit 204 sets up a session for performing a data communication with set-top box 130 based on the set-top box information (S408). In other words, session setup unit 204 receives, from information receiver 202, the serial number and the IP address of set-top box 130, which match the corresponding remote controller identification number, and based thereon, sets up the session for performing a data communication with set-top box 130 and allows terminal 110 to interwork with set-top box 130.

Content information receiver 206 receives, from set-up box 130, the content information on the content being played by set-top box 130 over the session set through session setup unit 204 (S410). Content information receiver 206 receives information on the content being played by set-top box 130 through the wireless communication such as Bluetooth and RF communication based on the preset session. At this time, the content information in set-top box 130 includes content information on a part or all of the content (i.e., content including at least one of visual content and audio content) played by set-top box 130 during a predetermined period of time including the time point when the tag information of remote controller 120 is recognized.

Content information transmitter 208 transmits the received content information to information provider 140, and content-related information receiver 210 receives, from information provider 140, content-related information extracted based on the content information (S412). In other words, content-related information receiver 210 receives, from information provider 140, the content-related information on the content that content information transmitter 208 has sent to information provider 140, among the prestored information in information provider 140.

Although steps S300 to S310 and steps S400 to S412 of FIGS. 3 and 4 have been described as being sequentially performed, this is merely an exemplary description of the technical idea of some embodiments of the present disclosure. Those skilled in the art will appreciate that various modifications, additions and substitutions are possible, without departing from the characteristics of some embodiments of the disclosure. For example, the order of steps shown in FIGS. 3 and 4 may be changed, or one or more of steps S300 to S310 and steps S400 to S412 may be performed in parallel. Therefore, the present disclosure is not limited to the time-series order as shown in FIGS. 3 and 4.

According to some embodiments of the present disclosure as described above, one or more exemplary embodiments provide an interactive IPTV service comprising receiving set-top box information by approaching a terminal having NFC function near a remote controller for a set-top box and establishing a session for data communication between the terminal and the set-top box based on the set-top box information. Then, the terminal receives and transmits content information on content(s) being played by the set-top box in the established session to a server, and receives, from the server, content-related information extracted based on the content information to thereby simplify the interworking between the set-top box and the terminal and obviate the high-cost exacted by the known interactive IPTV service, which enhances the performance of the interactive IPTV service.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A terminal device for carrying out an interactive internet protocol television (IPTV) service, the terminal device comprising:

a near distance communication unit configured to receive set-top box information from a remote controller which controls a set-top box used for the interactive IPTV service;

a session setup unit configured to set up a session to communicate between the terminal device and the set-top box based on the received set-top box information;

a content information receiver configured to receive, from the set-top box, content information on content being played by the set-top box over the set up session;

a content information transmitter configured to transmit the content information received from the content information receiver to an information provider; and a content-related information receiver configured to receive a content-related information from the information provider, the content-related information is extracted by the information provider from prestored information on a plurality of contents based on the content information, wherein the set-top box information includes a serial number and an internet protocol (IP) address of the set-top box, and wherein the near distance communication unit is configured to receive the set-top box information from the remote controller through a near distance communication when tag information of the remote controller is recognized.

2. The terminal device of claim 1, wherein the content information includes information on a part or all of the content being played by the set-top box during a predetermined period of time including a time point when the tag information is recognized, wherein the content includes at least one of visual content and audio content.

3. A terminal device for carrying out an interactive internet protocol television (IPTV) service, the terminal device comprising:

a near distance communication unit configured to receive remote controller-specific information of a remote controller from the remote controller which controls a set-top box used for the interactive IPTV service;

an information receiver configured to transmit the received remote controller-specific information to an information provider so as to receive, from the information provider, set-top box information that matches the remote controller-specific information;

a session setup unit configured to set up a session to communicate between the terminal device and the set-top box based on the set-top box information;

a content information receiver configured to receive, from the set-top box, content information on content being played by the set-top box over the set up session;

a content information transmitter configured to transmit the content information received from the content information receiver to the information provider; and a content-related information receiver configured to receive content-related information from the information provider, the content-related information is extracted by the information provider from prestored information on a plurality of contents based on the content information, wherein the set-top box information includes a serial number and an internet protocol (IP) address of the set-top box, and wherein the near distance communication unit is configured to receive the remote controller-specific information from the remote controller through a near distance communication when tag information of the remote controller is recognized.

4. The terminal device of claim 3, wherein the near distance communication unit is configured to receive, from the remote controller, the remote controller-specific information including a remote controller identification number assigned to the remote controller.

5. The terminal device of claim 3, wherein the information provider is configured to store, upon receipt from one or more set-top boxes, remote controller-specific information for one or more remote controllers matching the one or more set-top boxes, and a plurality of set-top box information including serial numbers and internet protocol (IP) addresses of the one or more set-top boxes.

6. The terminal device of claim 3, wherein the content information includes information on a part or all of the content being played by the set-top box during a predetermined period of time including a time point when the set-top box information is received, wherein the content includes at least one of visual content and audio content.

7. A method performed by a terminal device for carrying out an interactive internet protocol television (IPTV) service, the method comprising:
    receiving set-top box information from a remote controller which controls a set-top box used for the interactive IPTV service;
    setting up a session to communicate between the terminal device and the set-top box based on the received set-top box information;
    receiving, from the set-top box, content information on content being played by the set-top box over the set up session;
    transmitting a received content information to an information provider; and
    receiving content-related information from the information provider, the content-related information is extracted by the information provider from prestored information on a plurality of contents based on the content information,
    wherein the set-top box information includes a serial number and an internet protocol (IP) address of the set-top box, and
    wherein the terminal device receives the set-top box information from the remote controller through a near distance communication when tag information of the remote controller is recognized.

8. The method of claim 7, wherein the receiving of the content information comprises receiving information on a part or all of the content being played by the set-top box during a predetermined period of time including a time point when the set-top box information is received, wherein the content includes at least one of visual content and audio content.

9. A method performed by a terminal device for carrying out an interactive internet protocol television (IPTV) service, the method comprising:
    receiving remote controller-specific information of a remote controller from the remote controller which controls a set-top box used for the interactive IPTV service;
    transmitting the received remote controller-specific information to an information provider so as to receive, from the information provider, set-top box information that matches the remote controller-specific information;
    setting up a session to communicate between the terminal device and the set-top box based on the set-top box information;
    receiving, from the set-top box, a content information on content being played by the set-top box over the set up session; transmitting received content information to the information provider; and
    receiving content-related information from the information provider, the content-related information is extracted by the information provider from prestored information on a plurality of contents based on the content information,
    wherein the set-top box information includes a serial number and an internet protocol (IP) address of the set-top box, and
    wherein the terminal device receives the remote controller-specific information from the remote controller through a near distance communication when tag information of the remote controller is recognized.

10. The method of claim 9, wherein the receiving of the remote controller-specific information comprises receiving the remote controller-specific information including a remote controller identification number which is assigned to the remote controller.

11. The method of claim 9, further comprising:
    storing, upon receipt from one or more set-top boxes, remote controller-specific information for one or more remote controllers matching the one or more set-top boxes and a plurality of set-top box information including serial numbers and internet protocol (IP) addresses of the one or more set-top boxes.

12. The method of claim 9, wherein the receiving of the content information comprises receiving information on a part or all of the content being played by the set-top box during a predetermined period of time including a time point when the set-top box information is received, wherein the content includes at least one of visual content and audio content.

* * * * *